United States Patent
Timmerman et al.

(10) Patent No.: US 7,693,113 B2
(45) Date of Patent: Apr. 6, 2010

(54) CDMA SYSTEM TRANSMISSION MATRIX COEFFICIENT CALCULATION

(75) Inventors: Chayil S. Timmerman, Harleysville, PA (US); Ryan Samuel Buchert, Breinigsville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 481 days.

(21) Appl. No.: 11/784,747

(22) Filed: Apr. 9, 2007

(65) Prior Publication Data
US 2007/0189238 A1 Aug. 16, 2007

Related U.S. Application Data

(63) Continuation of application No. 10/264,192, filed on Oct. 3, 2002, now Pat. No. 7,203,181.

(60) Provisional application No. 60/392,202, filed on Jun. 28, 2002.

(51) Int. Cl.
*H04B 7/216* (2006.01)
(52) U.S. Cl. .................. 370/335; 370/342; 375/130
(58) Field of Classification Search .................. None
See application file for complete search history.

(56) References Cited

U.S. PATENT DOCUMENTS

| 5,793,759 | A | 8/1998 | Rakib et al. |
| 6,301,293 | B1 | 10/2001 | Huang et al. |
| 6,351,462 | B1 | 2/2002 | Komatsu |
| 6,449,246 | B1 | 9/2002 | Barton et al. |
| 2002/0015437 | A1 | 2/2002 | Li et al. |
| 2002/0146062 | A1 | 10/2002 | Bachu et al. |
| 2003/0095585 | A1 | 5/2003 | Huh et al. |
| 2004/0131030 | A1* | 7/2004 | Kuroyanagi et al. ........ 370/335 |
| 2006/0072680 | A1 | 4/2006 | Wang et al. |

FOREIGN PATENT DOCUMENTS

| CA | 2 388 024 | 4/2008 |
| CN | 1271219 | 10/2000 |
| EP | 0978951 | 2/2000 |
| JP | 2000-349691 | 12/2000 |

(Continued)

OTHER PUBLICATIONS

Klein et al., "Zero forcing and minimum mean-square-error equalization for multiuser detection in code-division multiple-access channels," IEEE Transactions on Vehicular Technology, vol. 45, Issue 2, pp. 276-287 (May 1996).

(Continued)

*Primary Examiner*—Duc C Ho
(74) *Attorney, Agent, or Firm*—Volpe and Koenig, P.C.

(57) ABSTRACT

A hermetian of a system response matrix is to be determined. Spreading codes, channel specific multipliers and channel impulse responses are provided. The channel code specific multipliers have real and imaginary values. Channel codes being a combination of a real spreading code, a complex scrambling code and a sign of the channel code specific multiplier. Real and imaginary components of an approximate hermetian of the system response matrix are determined. The channel code specific multipliers are applied to the real and imaginary components of a result of the convolutions to derive the hermetian of the system response matrix.

8 Claims, 6 Drawing Sheets

FOREIGN PATENT DOCUMENTS

| | | |
|---|---|---|
| JP | 2000349691 | 12/2000 |
| JP | 2004-096795 | 3/2004 |
| WO | 02/19558 | 3/2002 |
| WO | 02/25831 | 3/2002 |
| WO | 02/39610 | 5/2002 |
| WO | 03/058837 | 7/2003 |

OTHER PUBLICATIONS

Klein et al., "Zero forcing and minimum mean-square-error equalization for multiuser detection in code-division multiple-access channels," IEEE Transactions on Vehicular Technology, vol. 45, Issue 2, pp. 276-287 (May 1996).

* cited by examiner

SCTD BLOCK COMBINATION

SCTD BLOCK COMBINATION

ADDRESS GENERATION FOR $A^H$ MATRIX STORAGE

CDMA SYSTEM TRANSMISSION MATRIX COEFFICIENT CALCULATION

CROSS REFERENCE TO RELATED APPLICATIONS

This application is a continuation of U.S. patent application Ser. No. 10/264,192 filed Oct. 3, 2002 which claims priority to U.S. Provisional Application No. 60/392,202, filed Jun. 28, 2002.

BACKGROUND

The present invention relates to wireless digital communication systems. More particularly, the present invention relates to producing a system response matrix for such systems.

In code division multiple access communication systems, multiple users send multiple communications simultaneously. The multiple communications are transmitted using different channel codes. The channel codes proposed for the time division duplex mode for 3GPP are derived by combining a spreading code with a scrambling code and subsequently applying a channel code specific multiplier. During transmission, each communication experiences a channel response. One approach to recover data from the transmitted bursts is joint detection, where all users data is received simultaneously. Such a system is shown in FIG. 1. The joint detection receiver may be used in a user equipment or base station.

The multiple communications 20, after experiencing their channel response, are received as a combined received signal at an antenna 22 or antenna array. The received signal is reduced to baseband, such as by a demodulator 24, and sampled at a chip rate of the codes or a multiple of a chip rate of the codes, such as by an analog to digital converter (ADC) 26 or multiple ADCs, to produce a received vector, r. A channel estimation device 28 uses a reference signal, such as a midamble code or pilot code, to estimate the channel response of the communications 20. A joint detection device 30 uses the estimated or known spreading codes of the users' bursts and the estimated or known channel responses to estimate the originally transmitted data for all the users as a data vector, d.

The joint detection problem is typically modeled by Equation 1.

$$Ad+n=r \quad \text{Equation 1}$$

d is the transmitted data vector; r is the received vector; n is the additive white gaussian noise (AWGN); and A is the system response matrix, and is constructed by convolving the channel responses with the known channel codes.

Two approaches to solve Equation 1 is a zero forcing (ZF) and a minimum mean square error (MMSE) approach. A ZF solution, where n is approximated to zero, is per Equation 2.

$$d=(A^H A)^{-1} A^H r \quad \text{Equation 2}$$

A MMSE approach is per Equations 3 and 4.

$$d=R^{-1} A^H r \quad \text{Equation 3}$$

$$R=A^H A+\sigma^2 I \quad \text{Equation 4}$$

$\sigma^2$ is the variance of the noise, n, and I is the identity matrix.

For either a zero forcing or MMSE solution, the hermetian of the system response matrix, $A^H$, is derived. In the proposed TDD mode of 3GPP, the system response matrix is derived using the spreading codes, the scrambling code, channel code specific multipliers and the determined channel responses. The real spreading code is mixed with a complex scrambling code. The mixed result is multiplied to the channel code specific multipliers (being either real or imaginary) and the result is convolved with the complex channel responses. After the system response matrix is derived, the hermetian is taken to produce the $A^H$ matrix. Producing the $A^H$ matrix is a complicated operation requiring complex multiplications. Implementing multiplications in hardware is undesirable due to the number of transistors required to produce a multiplier.

Accordingly, it is desirable to have alternate approaches to generate the hermetian of the system response matrix.

SUMMARY

A hermetian of a system response matrix is to be determined. Spreading codes, channel specific multipliers and channel impulse responses are provided. The channel code specific multipliers have real and imaginary values. Channel codes being a combination of a real spreading code, a complex scrambling code and a sign of the channel code specific multiplier. Real and imaginary components of an approximate hermetian of the system response matrix are determined. The channel code specific multipliers are applied to the real and imaginary components of a result of the convolutions to derive the hermetian of the system response matrix.

DESCRIPTION OF THE PREFERRED EMBODIMENTS

Although the preferred embodiments are described in conjunction with the preferred application of the invention for use in a third generation partnership project (3GPP) time division duplex communication system using code division multiple access, the invention can be applied to any code division multiple access communication system. A receiver utilizing the following embodiments can be utilized in a user equipment or a base station.

The preferred embodiment of the invention mixes, for a particular received burst, the spreading code, the scrambling code and the sign of the channel code specific multiplier, preferably by an exclusive-or gate to produce an approximate channel code. The approximate channel code is convolved with the channel response to produce that burst's contribution to an approximate $B^H$ matrix of the $A^H$ matrix. The real or imaginary component of the channel code specific multipliers are applied to the real and imaginary portions of the approximate contribution to the $B^H$ matrix to produce that burst's contribution to the $A^H$ matrix. All of the received bursts contributions are applied to produce the $A^H$ matrix.

Figure 2A:
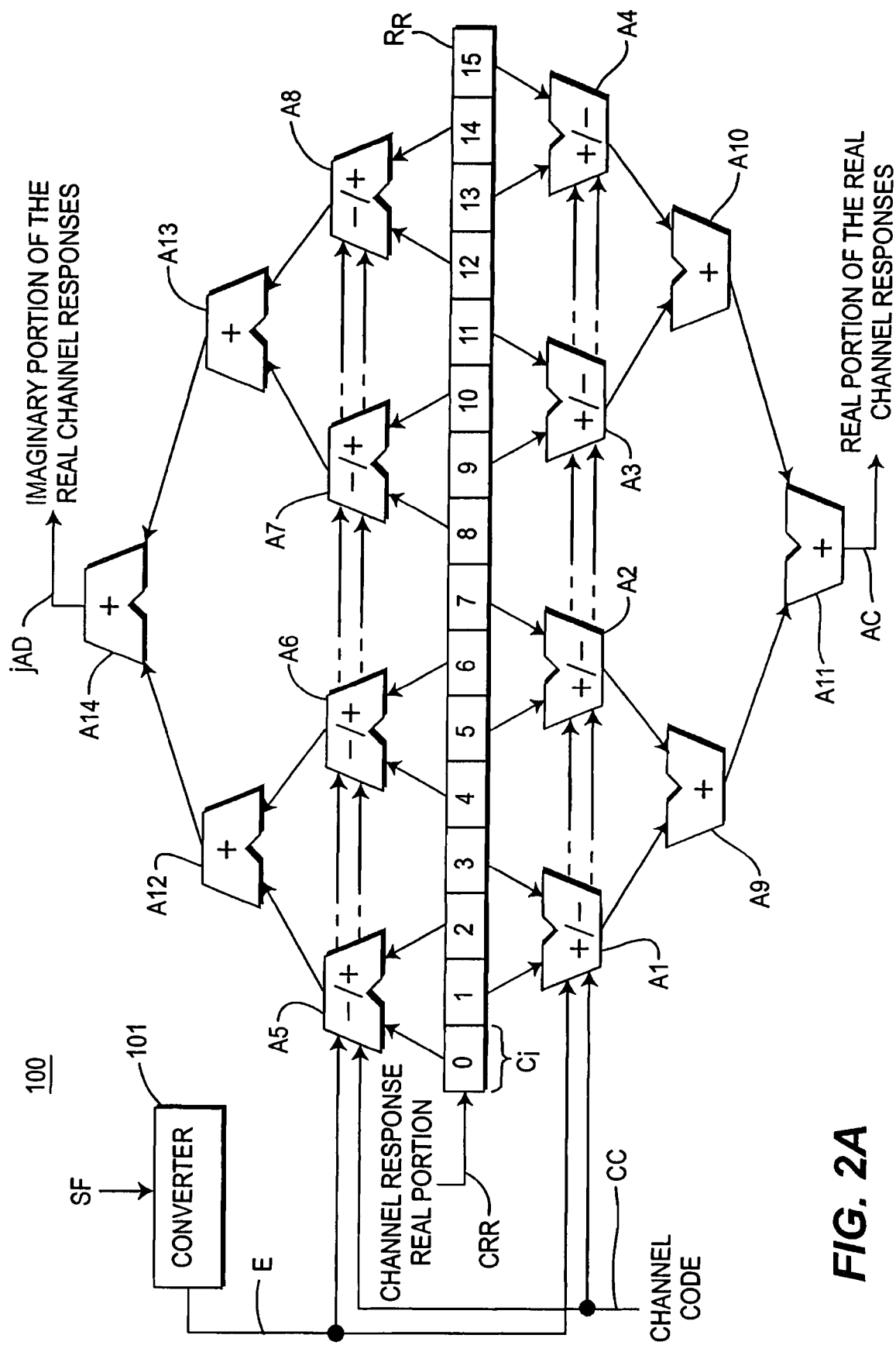
FIG. 2A shows the apparatus for convolving the real portion of the channel response.
Figure 2B:
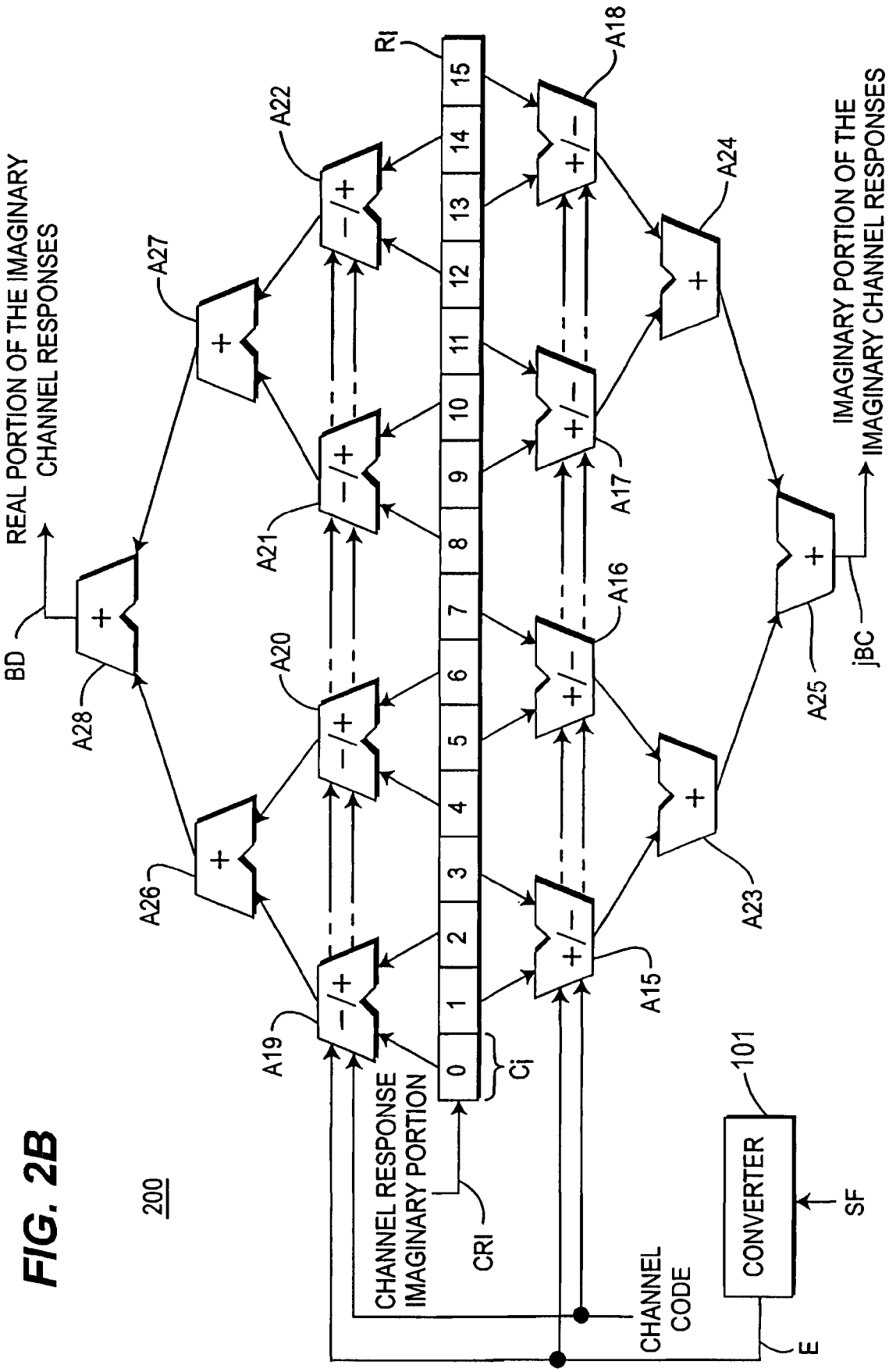
FIG. 2B shows the apparatus for convolving the imaginary portion of the channel response.

Referring to FIGS. 2A and 2B, the circuit diagrams 100 and 200, respectively, which perform convolution of a series of real and imaginary channel response chip values with the approximate channel code, are illustrated. The channel response values are divided into a real portion CRR and an imaginary portion CRI. The real channel response CRR is processed by the circuit 100 while the imaginary channel response CRI is processed in tandem by the circuit 200.

Figure 1:
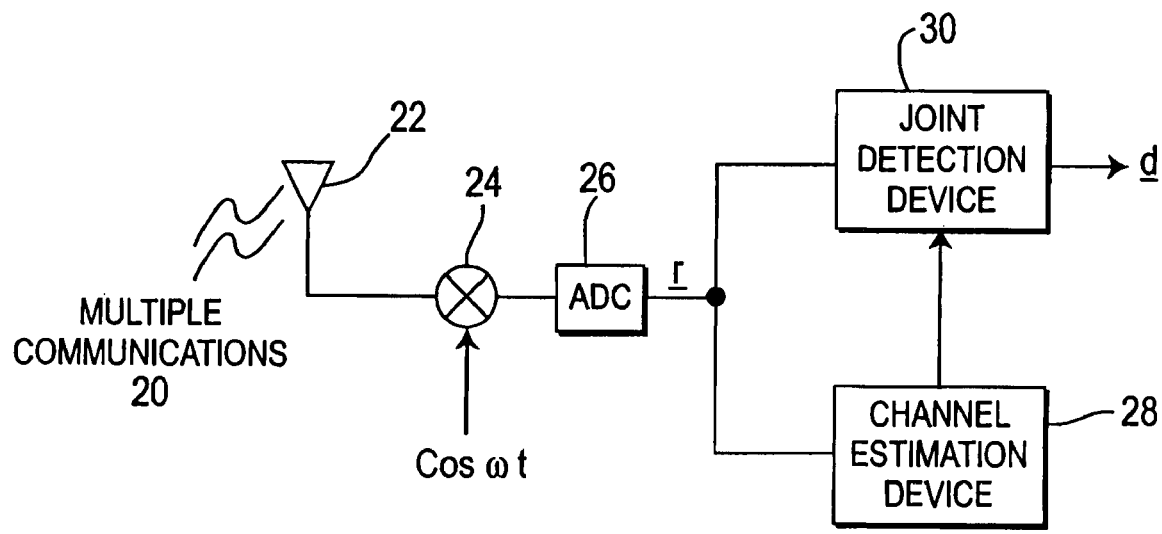
FIG. 1 is a simplified block diagram of a joint detection receiver.
Figure 4:
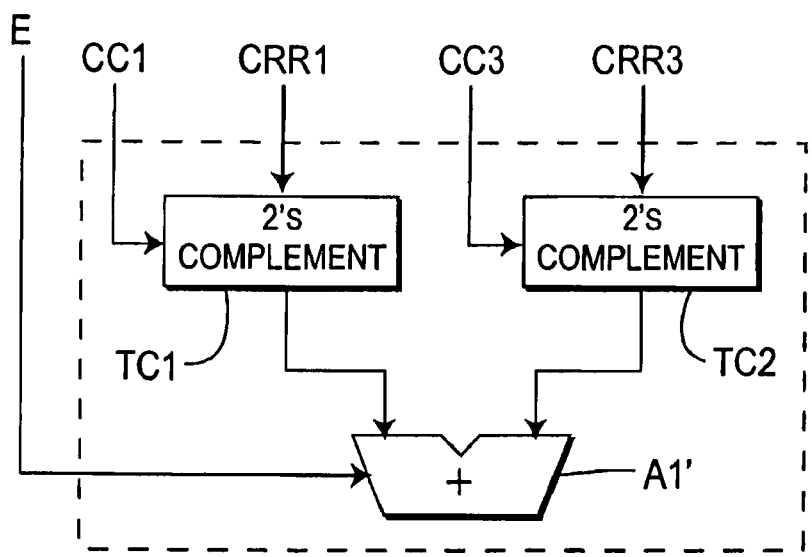
FIG. 4 shows a preferred circuit for adder tree inputs of FIG. 2A and FIG. 2B.

In FIG. 2A, register $R_R$ is preferably a 16-location shift register, which receives the real portion of the channel response CRR. Each location Ci (i=0 to 15) of register $R_R$ has F bits per location where F is a selected data bit size, preferably 10. The number of locations corresponds with the preferred channel code size, which for TDD mode of 3GPP is 16 and is otherwise preferably a power of 2 in number. The real component circuit 100 includes a plurality of components A1-A14, each component has an adder having two inputs and a single output which is the sum of the two inputs. Adder/subtractor components A1-A8 are preferably configured as illustrated in FIG. 4. Adder components A9-A14 are preferably simple adders.

Adder/subtractor components A1, A2, A3, A4 receive input from the odd locations of register $R_R$ and perform either addition or subtraction on their pair of inputs. Similarly, adder/subtractor and adder components A5, A6, A7 and A8 are coupled to register $R_R$ to perform addition or subtraction on the channel response values, but only operate on the even locations of register $R_R$. Collectively, adder components A1-A4, A9-A11 form one adder tree circuit having inputs defined by components A1-A4 and an output defined by component A11. Similarly, adder components A5-A8, A12-A14 form a second adder tree circuit. The association of the adder tree circuits with the register $R_R$ is such that real and imaginary portions of processing values of the CRR values being processed through register $R_R$ are computed.

Acting as a control signal, a channel code CC having bits CC0 through CC15 are input to the adder/subtractor components A1 through A8. The binary channel codes control whether adder components A1 through A8 perform an addition or a subtraction dependent upon the respective control bit, preferably addition when the channel code CC bit=0 and subtraction when the channel code CC bit=1.

FIG. 4 illustrates a preferred construction of input adder component A1 having an adder A1' and two two's complement devices TC1, TC2. Inputs CRR1 and CRR3 receive the real channel response values contained in second and fourth locations C1, C3 of register $R_R$, which are processed by two's complement devices TC1, TC2. CCR value addition or subtraction is accomplished by the adder A1' summing the output of the two's complement devices TC1, TC2. The two's complement devices TC1, TC2 operate on the input values by either passing the value or its two's complement through to the adder A1'. The second bit CC1 of the 16 bit channel code control signal CC determines the operation performed by the two's complement device TC1 while the fourth bit CC3 of the channel code determines the operation performed by the two's complement device TC2.

Referring to FIG. 2A, adder A9 performs a summation of the sums performed by A1 and A2. Likewise, adder A10 sums the sum of A3 with the sum of A4, adder A12 performs the sum of A5 and A6, and adder A13 sums A7 with A8. Adder A11 produces output AC, the real portion of the real channel response values, by adding the sum of A9 with the sum of A10. Output jAD, the imaginary portion of the real channel response values, is the sum produced by adder A14, which is the sum of the outputs of adders A12 and A13.

Processing circuit 200, shown in FIG. 2B, is constructed similarly to the circuit 100 shown in FIG. 2A. However, the shift register $R_I$ receives the imaginary portion of the channel response CRI. Components A15 through A28 correspond with adder components A1 through A14 to provide the register $R_I$ with two associated adder tree circuits. The two outputs of the tree circuits of circuit 200 shown in FIG. 2B are opposite of those shown in FIG. 2A for circuit 100, in that a value corresponding to a real portion shown as output BD comes from the even locations of register $R_I$ and a value corresponding to an imaginary output jBC is the final sum of the odd numbered locations of register $R_I$. The configurations of real and imaginary outputs relative to even and odd register locations could be completely reversed, and identical results could be obtained. Specifically, with registers $R_R$ and $R_I$ swapped in FIGS. 2A and 2B, output AC and jBC would be derived from even register locations and outputs BD and jAD would be derived from odd register locations.

Although the registers of FIGS. 2A and 2B have been represented with 16 locations apiece, convolution of channel response values in accordance with the present invention could generally be achieved using registers having $2^N$ register locations and a combination of more or less adders all configured accordingly to perform the sums on the even and odd register locations.

The four output values AC, BD, jAD and jBC of the circuits 100 and 200 represent real and imaginary portions of a multiplication operation as shown in Equation 1:

$$B^H = (A+jB)^*(C+jD) \qquad \text{Equation 1}$$

where A is the real portion of the channel response, B is the imaginary portion of the channel response and where C corresponds to bits C1, C3, C5, C7, C9, C11, C13, C15 of the channel code CC, D corresponds to bits C0, C2, C4, C6, C8, C10, C12, C14 of the channel code. Each channel code bit represents a value that is either purely real or purely imaginary. Accordingly, the tree circuits can be hardwired to either all of the odd or all of the even locations of the registers $R_R$ and $R_I$. The trees used in accordance with the present invention for determining which channel code bits are real or imaginary eliminates the need for multipliers, which would consume hardware space to a greater degree.

Figure 3:
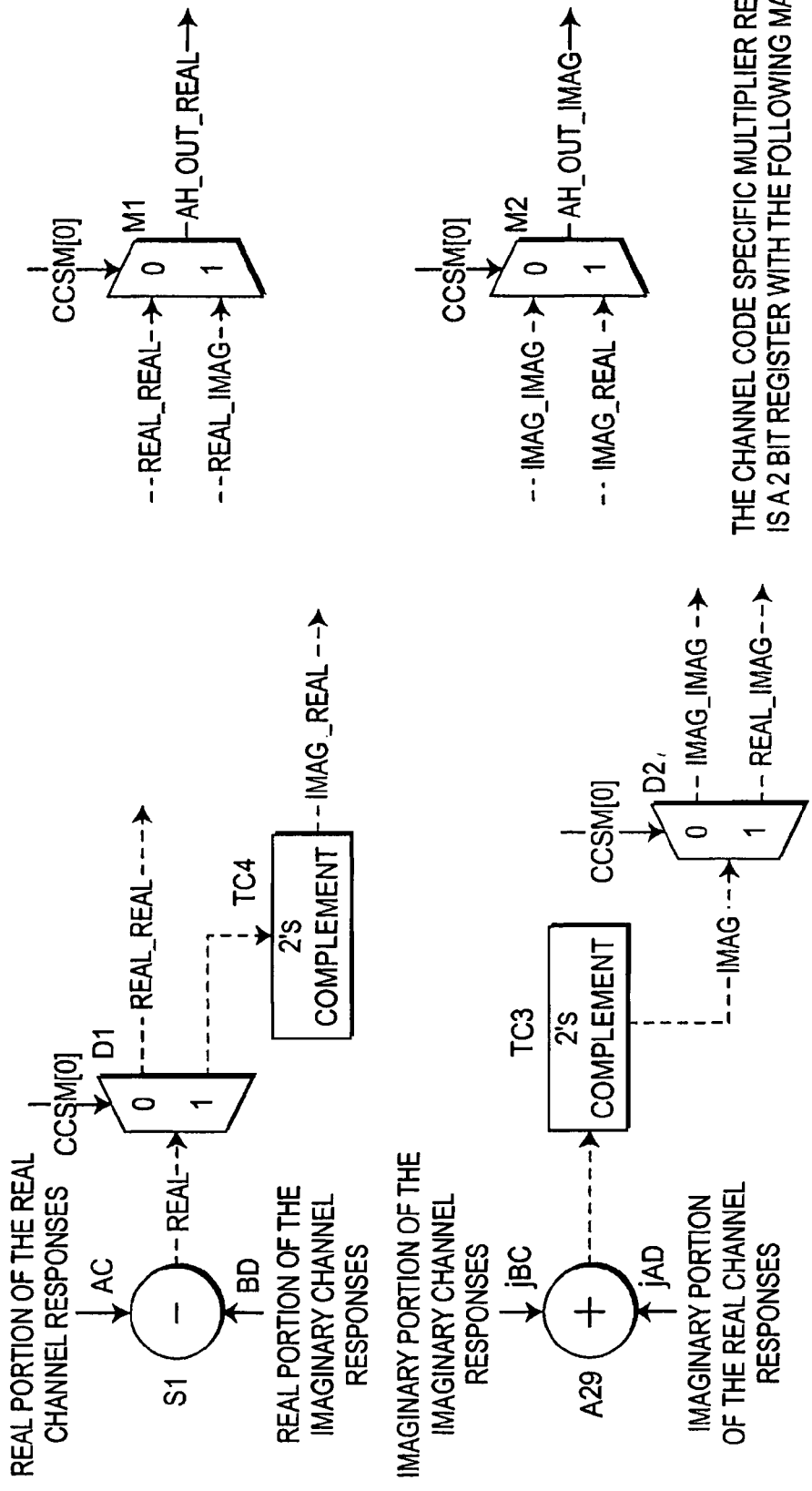
FIG. 3 shows the apparatus for summing the outputs of the FIG. 2A and FIG. 2B apparatuses to produce real and imaginary output used to construct the system response matrix.

As shown in FIG. 3, additional circuitry is provided to combine the outputs of the trees of circuits 100, 200 to produce coefficient values corresponding to real and imaginary output values of the approximate $B^H$ and apply the channel code specific multiplier to produce $A^H$. A subtracter S1 is associated with output AC of circuit 100 and output BD of circuit 200 to subtract the real portion of the processed real channel response signal and the real portion of the imaginary channel response signal. An adder A29 is associated with output jBC of circuit 200 and jAD of circuit 100 to sum the imaginary portion of the processed imaginary channel response signal and the imaginary portion of the real channel response signal. The sum produced by adder A29 is then passed through two's complement device TC3 for the imaginary output, which produces the complex conjugate of the B matrix.

After the real and imaginary contribution of the burst to the $B^H$ matrix is determined, the imaginary/real aspect of the channel code specific multiplier is applied to produce that burst's contribution to the $A^H$ matrix. Referring to FIG. 3, the channel code specific multipliers are preferably stored in a two bit register. Bit 1 in the register represents whether the channel code specific multiplier is positive (a zero value) or negative (a one value). Bit 0 in the register represents whether the channel code specific multiplier is imaginary (a value of one) or real (a value of zero).

Referring to FIG. 3, the real contribution is input into a demultiplexer D1. After applying the channel code specific multiplier, the real contribution to $B^H$ may correspond to the real contribution (Real_Real) to $A^H$ or the imaginary contribution (Imag_Real) to $A^H$. The demultiplexer D1 separates the real contribution of $B^H$ in response to bit 0 of the channel code specific multiplier. If bit 0 is a zero, the output is to Real_Real and if the channel code specific multiplier is a one, the output is to Imag_Real after the 2's complement is taken by a 2's complement device TC4.

Analogously, the imaginary contribution to $B^H$ may correspond to the imaginary contribution (Imag_Imag) to $A^H$ or the real contribution (Real_Imag) to $A^H$. The demultiplexer D2 separates the imaginary contribution of $B^H$ in response to bit 0 of the channel code specific multiplier. If bit 0 is a zero, the output is to Imag_Imag and if the channel code specific multiplier is a one, the output is to Real_Imag.

After separation, a pair of multiplexers M1, M2 are used to produce the real and imaginary contributions of the burst to the $A^H$ matrix. A real multiplexer M1 selects either the Real_Real or Real_Imag as the real contribution (ah_out_real). If bit 0 is a zero, the Real_Real is selected and if bit 0 is a one, the Real_Imag is selected. Similarly, an imaginary multiplexer M2 selects either the Imag_Imag or Imag_Real as the imaginary contribution (ah_out_imag). If bit 0 is a zero, the Imag_Imag is selected and if bit 0 is a one, the Imag_Real is selected. Accordingly, the contribution of that burst to $A^H$ is determined. After all the bursts are determined, the entire $A^H$ is determined. As illustrated by the preferred embodiment, multipliers are not required for the production of the $A^H$ matrix.

In 3GPP, it is proposed to transmit the broadcast channel over two antennas using a different spreading code for each antenna, referred to hereafter as space code transmit diversity (SCTD). Since the same broadcast data is sent over the two channels, the contribution of each channel can be combined prior to data estimation. Furthermore, it is proposed that multiple broadcast channels as well as other channels may be transmitted using SCTD.

Figure 5:
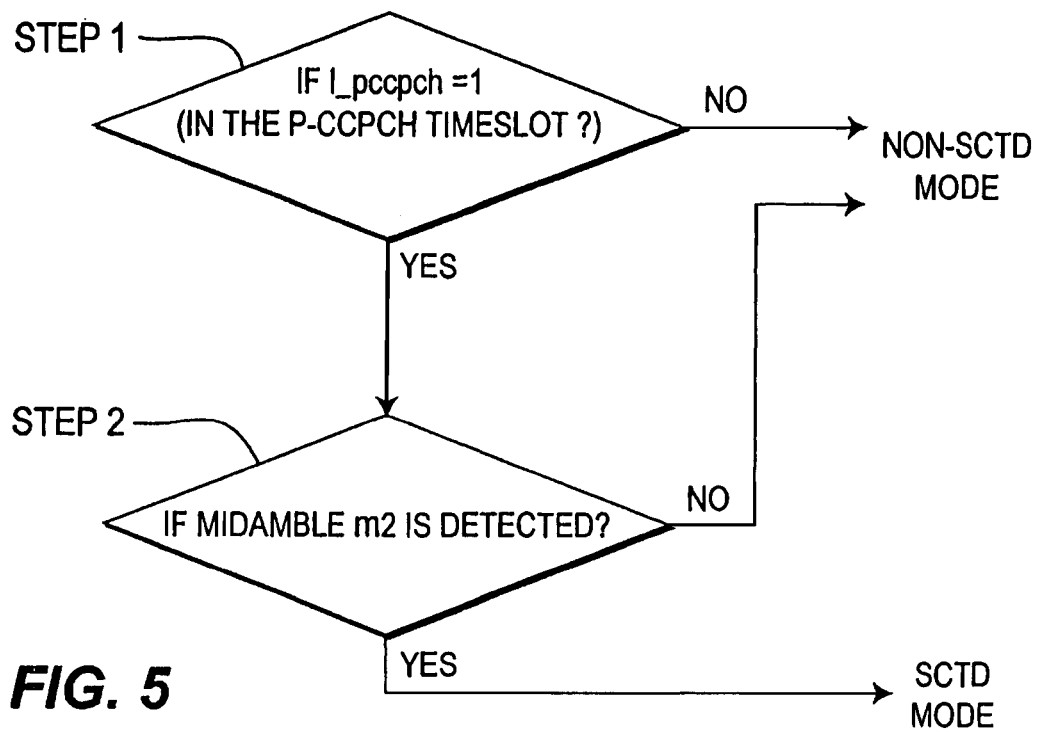
FIG. 5 shows a flow chart for determining whether space code transmit diversity is supported for the broadcast channel.

FIG. 5 is a preferred flow chart for determining whether combining of the two channel codes to support SCTD is required for a single BCH as currently proposed. The primary common control physical channel (P-CCPCH) is monitored to determine if SCTD mode is supported, SPEP1. If it is not (I_pccpch is zero), SCTD mode is not supported. If it is, a midamble detection device determines whether midamble m2 is present, STEP2. If m2 is present, SCTD mode is supported. If not, SCTD mode is not supported.

Figure 6A:
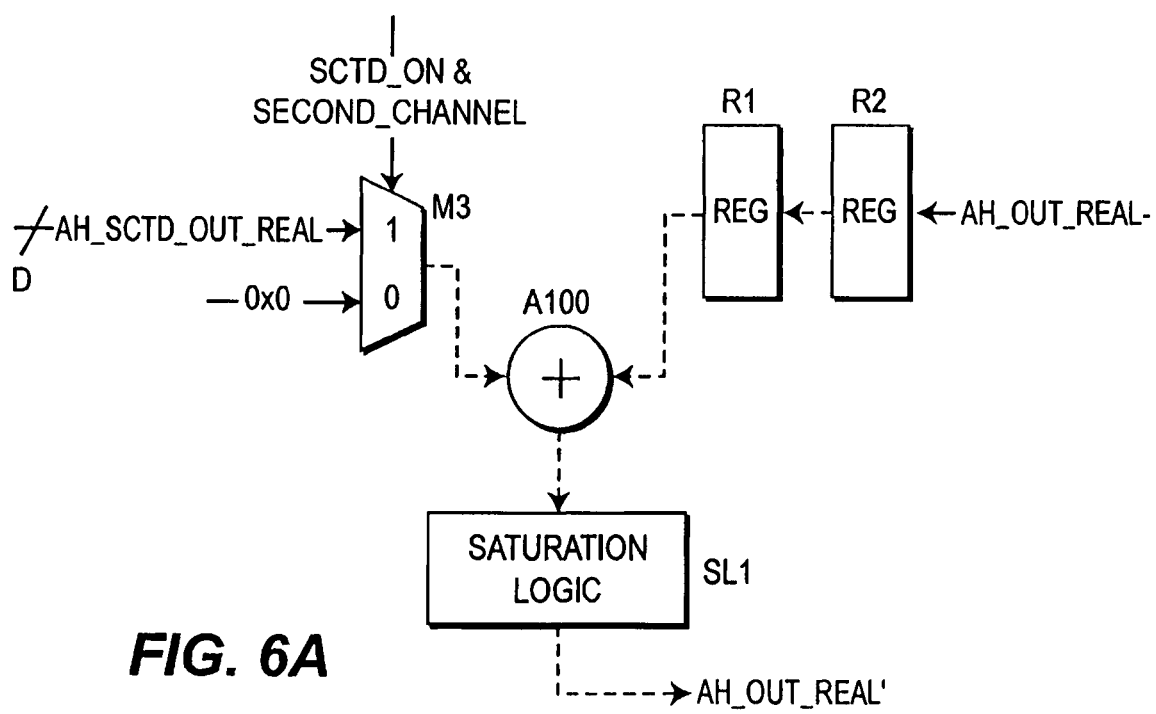
FIGS. 6A and 6B show preferred circuits for combining code contributions for input into the hermetian of the system response matrix.
Figure 6B:
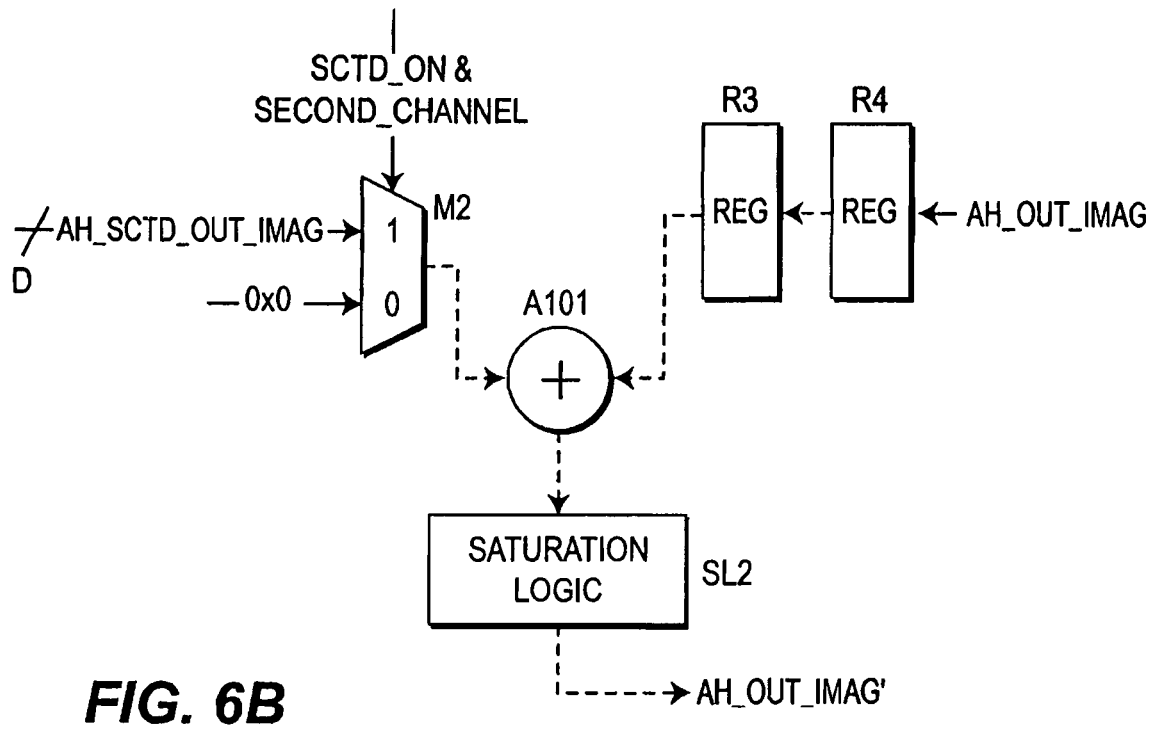
Figure 7:
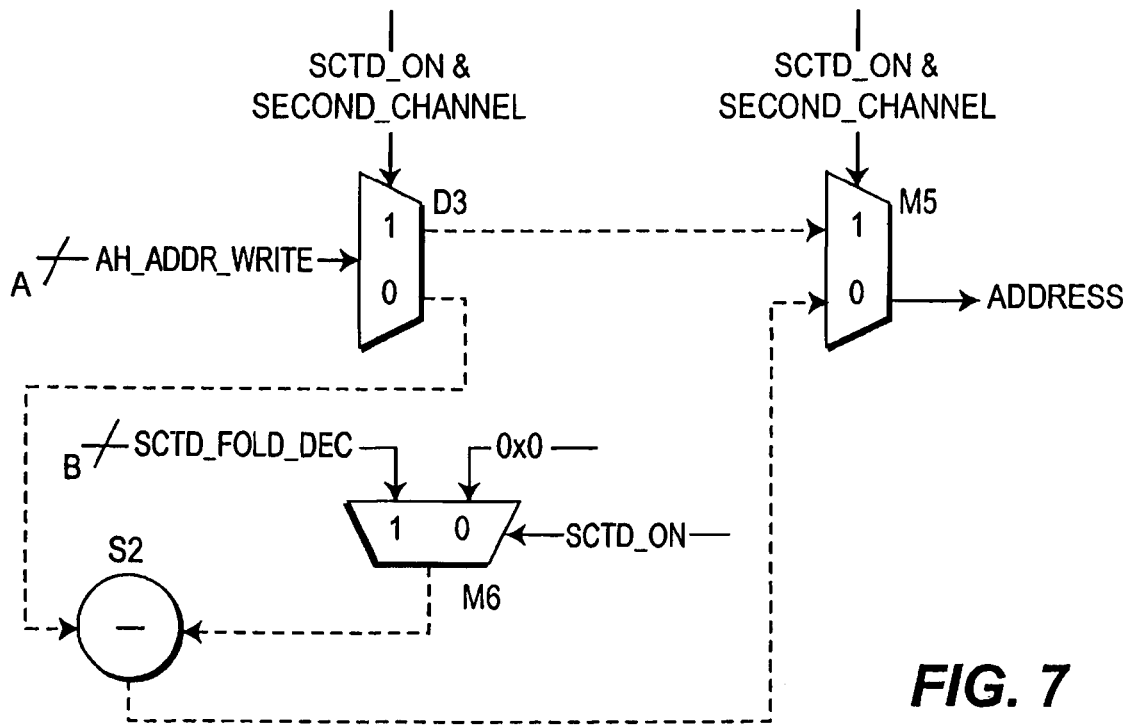
FIG. 7 shows a preferred circuit for determining the addresses for the circuits of FIGS. 6A and 6B.

FIGS. 6A, 6B and 7 illustrate a preferred embodiment for selectively supporting SCTD. The selective SCTD is preferably used with a single BCH, multiple BCHs and other channels transmitted using selective SCTD. FIG. 6A processes the real contribution of the channels. If SCTD is supported, the real contribution of a first code is referred to as ah_sctd_out_real and the second code ah_out_real. If SCTD is not supported, ah_sctd_out_real is not present.

ah_sctd_out_real is an input to a multiplexer M3. The other input is tied to zero (0×0). If SCTD is supported (sctd_on & second_channel is a one), ah_sctd_out_real is passed to an adder A100. If SCTD is not supported, zero is sent to the adder A100. ah_out_real is also input to the adder A100 to produce either the real combined contribution of the two channels, if SCTD is supported, or simply passes the channel (ah_out_real).(Note: there is no first or second channel if it isn't an SCTD channel.) Saturation logic SL1 is used to prevent the combined contributions from overflowing the bit width of the memory. As shown in FIG. 6A, preferably, two registers R1, R2 are used to temporarily buffer the contribution of the second channel (ah_out_real).

FIG. 6B processes the imaginary contribution of channels. If SCTD is supported, the imaginary contribution of a first code is referred to as ah_sctd_out_imag and the second code ah_out_imag. If SCTD is not supported, ah_sctd_out_imag is not present. ah_sctd_out_imag is an input to a multiplexer M4. The other input is tied to zero (0×0). If SCTD is supported (sctd_on & second_channel is a one), ah_sctd_out_imag is passed to an adder A101. If SCTD is not supported, zero is sent to the adder A101. ah_out_imag is also input to the adder A101 to produce either the imaginary combined contribution of the two channels, if SCTD is supported, or simply passes the channel (ah_out_imag). Saturation logic is used to prevent combined contributions from overflowing the bit width of the memory. As shown in FIG. 6B, preferably, two registers R3, R4 are used to temporarily buffer the contribution of the first channel (ah_out_imag).

This approach to combining the two channels reduces the memory requirement and the amount of time required to calculate the final result. As the second channel's contribution is processed, it is combined with the stored first channel and the combined channel is stored. Accordingly, the second channel is never stored. Preferably, the combined channel is written back to the addresses of the first channel. If the first channel is not stored in a read-modify-write memory, two registers R1, R2, R3, R4 as shown in FIGS. 6A and 6B are preferably used. If the first channel memory is a read-modify-write memory, only one register R1, R3 is preferably used.

FIG. 7 is a preferred circuit for use in conjunction with FIGS. 6A and 6B in determining the address of the second code whether SCTD is or is not supported. As the $A^H$ matrix is developed, each produced value is preferably stored in a subsequent memory address. If the first two channels are combined for SCTD, the combined channel contributions are preferably overwrite the first channel to reduce the required memory. To illustrated, if SCTD is not supported, the sequential address for the first location of the second channel may be address 516. If SCTD is supported, that value will be combined with the first channel and written back to the first address of first channel memory, address 0.

The address that the determined channel value is written to, when SCTD is not supported, is ah_addr_write. A control signal, sctd_on & second_channel, indicates whether SCTD is supported. If SCTD is supported sctd_on & second_channel has a value of a zero and if not, sctd_on & second_channel has a value of one. The address is input to a demultiplexer D3. If SCTD is not supported (sctd_on & second_channel has a value one), the address is passed to a multiplexer M5. The multiplexer M5 passes the address on, if SCTD is not supported.

If SCTD is supported, the address (ah_addr_write) is input to a subtractor S2. The subtractor subtracts from the address the number of memory values of the first channel (sctd_fold_dec). To reduce power consumption when SCTD is not supported, a second multiplexer M6 is used. The multiplexer M6 selects sctd_fold_dec for input to the subtractor S2, when SCTD is supported (sctd_on is a one). If SCTD is not supported (sctd_on is a zero), a zero (0×0) is input to the subtractor S2. The output of the multiplexer M6 is input into the multiplexer M5. The multiplexer M5 selects the subtracted input, when SCTD is supported.

What is claimed is:

1. A method for determining a hermetian of a system response matrix of a receiver receiving multiple communication bursts, the bursts comprising channel codes, the method comprising:
   sampling a received communication burst;
   convoluting the sampled chip values of the communication burst with approximate channel codes;
   storing a real channel response and an imaginary response in a first register and a second register respectively, the real channel response and the imaginary channel response being results of the convolution;
   obtaining an imaginary portion and a real portion of the real channel response and an imaginary portion and a real portion of the imaginary channel response by adding/subtracting even locations of the first and second registers respectively and odd locations of the first and second registers respectively;
   obtaining an imaginary part of a contribution to the system response matrix due to the burst by combining the imaginary portion of the real channel response and the imaginary portion of the imaginary channel response; and
   obtaining a real part of a contribution to the system response matrix due to the burst by combining the real portion of the real channel response and the real portion of the imaginary channel response.

2. The method of claim 1 wherein the adding or subtracting in obtaining the imaginary portion and real portion of the channel response is determined in accordance with the channel codes.

3. A base station for determining a hermetian of a system response matrix, the base station receiving multiple communication bursts, the communication bursts including channel codes, the base station comprising:
   at least a first register which stores a real channel response, the real channel response being derived from a convolution of a channel response chip values of a burst with approximate channel codes;
   at least a second register which stores an imaginary channel response, the imaginary channel response being derived from a convolution of the channel response chip values of the burst with the approximate channel codes;
   several groups of adders/subtractors adding/subtracting even and odd locations of the first and the second registers to produce real portion and imaginary portion of the real channel response and real portion and imaginary portion of the imaginary channel response respectively;
   an operator producing a real part of a contribution to the system response matrix owing to the burst by combining the real portion of the real channel response and the real portion of the imaginary channel response; and
   an operator producing an imaginary part of a contribution to the system response matrix owing to the burst by combining the imaginary portion of the real channel response and the imaginary portion of the imaginary channel response.

4. The base station of claim 3 wherein the several groups of adders/subtractors comprises:
   a first group of adders/subtractors adding or subtracting even locations of the first register;
   a second group of adders/subtractors adding or subtracting odd locations of the first register;
   a third group of adders/subtractors adding or subtracting even locations of the second register; and
   a fourth group of adders/subtractors adding or subtracting odd locations of the second register.

5. The base station of claim 4 wherein the adding or subtracting is determined in accordance with the channel code.

6. A wireless transmit/receive unit (WTRU) for determining a hermetian of a system response matrix, the WTRU receiving multiple communication bursts, the communication bursts including channel codes, the WTRU comprising:
   at least a first register which stores a real channel response, the real channel response being derived from a convolution of a channel response chip values of a burst with approximate channel codes;
   at least a second register which stores an imaginary channel response, the imaginary channel response being derived from a convolution of the channel response chip values of the burst with the approximate channel codes;
   several groups of adders/subtractors adding/subtracting even and odd locations of the first and the second registers to produce real portion and imaginary portion of the real channel response and real portion and imaginary portion of the imaginary channel response respectively;
   an operator producing a real part of a contribution to the system response matrix owing to the burst by combining the real portion of the real channel response and the real portion of the imaginary channel response; and
   an operator producing an imaginary part of a contribution to the system response matrix owing to the burst by combining the imaginary portion of the real channel response and the imaginary portion of the imaginary channel response.

7. The WTRU of claim 6 wherein the several groups of adders/subtractors comprises:
   a first group of adders/subtractors adding or subtracting even locations of the first register;
   a second group of adders/subtractors adding or subtracting odd locations of the first register;
   a third group of adders/subtractors adding or subtracting even locations of the second register; and
   a fourth group of adders/subtractors adding or subtracting odd locations of the second register.

8. The WTRU of claim 7 wherein the adding or subtracting is determined in accordance with the channel code.

* * * * *